United States Patent [19]
Dolfi, Sr.

[11] 3,825,031
[45] July 23, 1974

[54] LINE VACUUM CONTROLLED MANIFOLD VACUUM SPOILER

[76] Inventor: James J. Dolfi, Sr., P.O. Box 434, Torrance, Calif. 90508

[22] Filed: Jan. 7, 1974

[21] Appl. No.: 431,484

Related U.S. Application Data

[63] Continuation-in-part of Ser. No. 284,271, Aug. 8, 1972.

[52] U.S. Cl. ............................... 137/480, 137/483
[51] Int. Cl. ................................................ F16k 17/04
[58] Field of Search .......................... 137/480, 483

[56] References Cited
UNITED STATES PATENTS

| | | | |
|---|---|---|---|
| 1,434,282 | 10/1922 | Clifford | 137/480 |
| 2,044,342 | 6/1936 | Abbott | 137/480 |
| 2,720,890 | 10/1955 | Stroud | 137/480 |
| 3,176,670 | 4/1965 | Sinibaldi | 137/480 X |
| 3,463,132 | 8/1969 | Krieck | 137/480 X |

*Primary Examiner*—Harold W. Weakley
*Attorney, Agent, or Firm*—Clarence A. O'Brien; Harvey B. Jacobson

[57] ABSTRACT

A valve body having an L-shaped airflow passage formed therethrough including first and second angulated end portions. One free end of one of the end portions is provided with air filtering structure and the free end of the other angulated end portion is communicated with a positive crankcase ventilation line intermediate its opposite ends. The adjacent communicating ends of the angulated end portions of the passages are disposed for free passage of air through the passage into the associated positive crankcase ventilation line. However, the valve body includes a large diameter bore formed therein including inner and outer ends with the inner end generally concentric with and opening into the smaller diameter inner end portion of the air filter equipped end portion of the passage. The outer end of the bore includes limited communication with the ambient atmosphere and a piston is slidable in the bore and includes an integral shank portion reciprocal in the air filter structure equipped angulated end portion of the passage, the piston being spring-biased toward the outer end of the bore. Upon the passage through the valve body being subject to high manifold vacuum through the associated positive crankcase ventilation line the piston is shifted inwardly of the bore and the shank portion of the piston is shifted further into the air filter structure equipped end portion of the passage for variably throttling the juncture between the inner ends of the angulated end portions of the passage.

9 Claims, 4 Drawing Figures

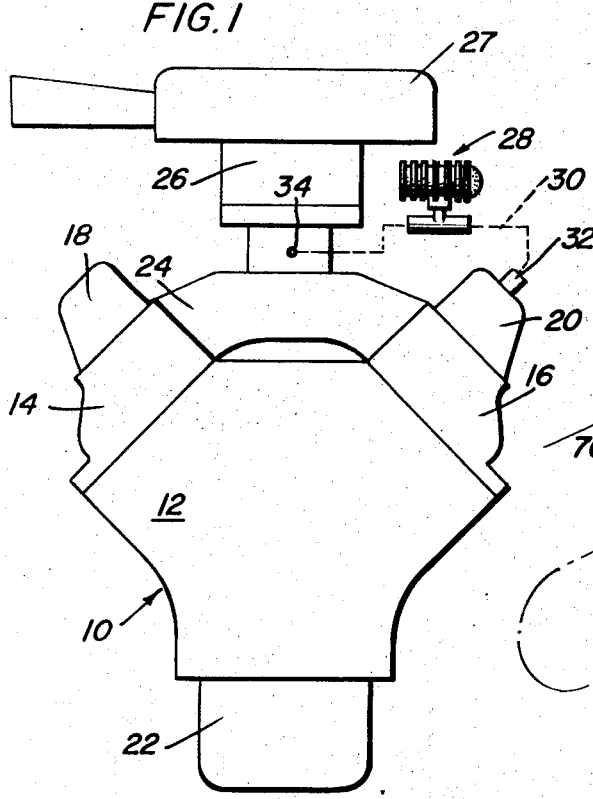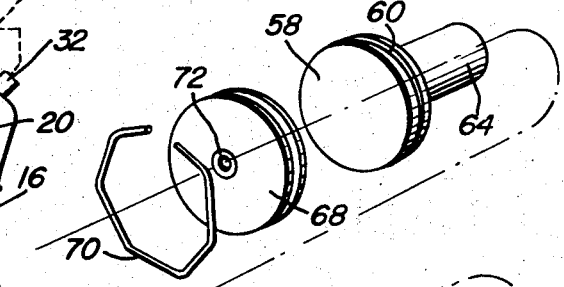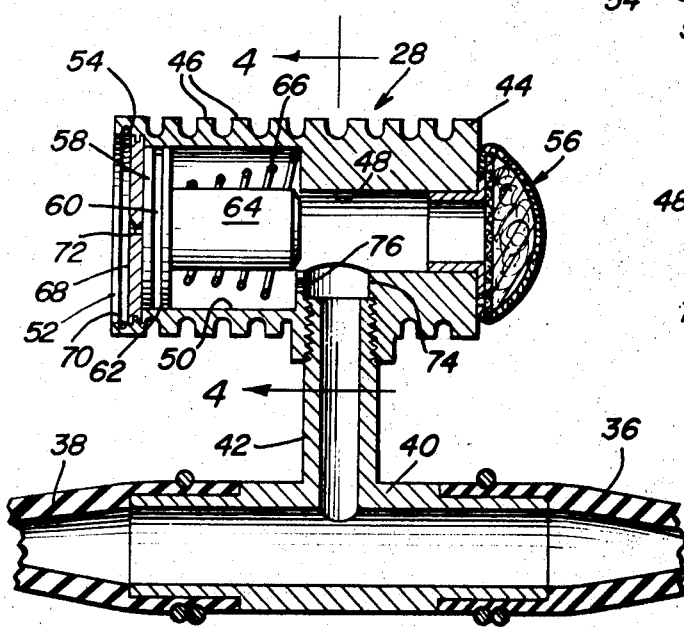

3,825,031

LINE VACUUM CONTROLLED MANIFOLD VACUUM SPOILER

This application comprises a continuation-in-part of my copending U.S. application Ser. No. 284,271, filed Aug. 8, 1972 for AUTOMATIC MANIFOLD VACUUM SPOILER.

BACKGROUND OF THE INVENTION

Automotive and other internal combustion engines presently being manufactured include provisions for reducing air pollutants. One of these provisions consists of a crankcase ventilation line communicated at one end with the interior of the crankcase and at the other end with the air inlet passages of the engine subject to manifold vacuum. This ventilation line is conventionally controlled by a valve referred to as a positive crankcase ventilation valve. However, the positive crankcase ventilation valves presently in use do not adequately control the flow of crankcase vapors through the line and to the intake passages of the engine under all operating conditions of the engine.

When an engine is decelerating there is little piston blow-by and therefore very little crankcase vapors which tend to constitute air pollutants. However, when the engine is operating at a high power setting there is a considerable amount of piston blow-by resulting in a buildup of air pollutant vapors within the crankcase.

SUMMARY OF THE INVENTION

The manifold vacuum spoiler of the instant invention is constructed in a manner whereby ambient air may be drawn into the positive crankcase ventilation line at a first low volume when the engine is decelerating and under the influence of high intake manifold vacuum and at a second high volume when the engine is operating under heavy load conditions and low manifold vacuum. In this manner, the crankcase vapors which pass through the associated positive crankcase ventilation line are diluted slightly by ambient air under low manifold vacuum operating conditions and are more heavily diluted by fresh ambient air under low manifold vacuum operating conditions.

The main object of this invention is to provide an apparatus which will automatically dilute crankcase vapors passing through a positive crankcase ventilation line with fresh ambient air at a first low level in response to high intake manifold vacuum and at a second higher level in response to low intake manifold vacuum conditions.

Another object of this invention, in accordance with the immediately preceding object, is to provide a valve construction in accordance with the immediately preceding object including air filtering structure for filtering the fresh ambient air passing therethrough toward the associated positive crankcase ventilation line.

Still another object of this invention is to provide an apparatus in accordance with the preceding objects and constructed in a manner whereby it may be readily operatively associated with existing conventional positive crankcase ventilating systems.

A further important object of this invention is to provide a valve construction in accordance with the desired operating characteristics of the instant invention and which will be extremely easy to disassemble and clean.

A final object of this invention to be specifically enumerated herein is to provide a valve construction which will conform to conventional forms of manufacture, be of simple construction and automatic in operation so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an end elevational view of a conventional form of automotive-type internal combustion engine with the vacuum spoiler of the instant invention operatively associated therewith;

FIG. 2 is an enlarged fragmentary vertical sectional view taken substantially upon a plane passing through the center of the vacuum spoiler;

FIG. 3 is an exploded perspective view of the vacuum spoiler; and

FIG. 4 is a fragmentary vertical sectional view taken substantially upon the plane indicated by the section line 4—4 of FIG. 2.

DESCRIPTION OF THE PREFERRED EMBODIMENT

Referring now more specifically to the drawings, the numeral 10 generally designates an internal combustion engine including a block 12, cylinder heads 14 and 16, topped by rocker arms 18 and 20, respectively. The lower end of the block 12 is closed by means of an oil pan 22 and an intake manifold 24 is mounted between the cylinder heads 14 and 16 and supports a conventional form of carburetor 26 thereon topped by an air cleaner 28. Of course, the air cleaner 27 comprises an inlet for air to the air and fuel passages (not shown) extending through the carburetor 26 and the intake manifold 24 has passages therein communicating the discharge ends of the carburetor air and fuel passages with the inlet passages of the cylinder heads 14 and 16, the internal passages of the intake manifold 24 also not being shown.

The manifold vacuum spoiler of the instant invention is referred to in general by the reference numeral 28. The vacuum spoiler 28 is operatively associated with a conventional positive crankcase ventilation line 30 extending between a positive crankcase ventilation valve 32 opening downwardly through the top of the rocker arm cover 20 and a passage 34 opening into the base of the carburetor and the air and fuel passages therein.

The line 30 includes line sections 36 and 38 and a T-fitting 40 is interposed in the line 30 between the sections 36 and 38, see FIG. 2. The T-fitting 40 includes a lateral neck 42 which is externally threaded at its outer end.

The vacuum spoiler 28 comprises a generally cylindrical body 44 constructed of a durable material such as aluminum. The body 44 includes axially spaced and periperally extending cooling fins 46 and is further provided with a longitudinal bore 48 including a first diametrically enlarged counterbore at one end terminating outwardly in a second further diametrically enlarged counterbore 52 at its outer end having a circumferential groove 54 formed therein.

A necked air filter assembly referred to in general by the reference numeral 56 is removably supported from the end of the bore 48 remote from the counterbore 50 and a piston 58 having a circumferential groove 60 is slidably disposed in the first counterbore 50. The groove 60 of the piston 58 has a sealing ring 62 disposed therein and the end of the piston 58 adjacent the bore 48 includes an integral piston rod portion 64 which projects slightly into the adjacent end of the bore 48. A compression spring 66 is disposed about the shank portion 64 between the inner end of the first counterbore 50 and the opposing inner side of the piston 58. In addition, a circular end closure plate 68 is seated in the second counterbore 52 and retained therein by means of a removable wire retainer 70 and the end closure or wall 68 includes a small diameter central bore 72 formed therethrough.

The body 44 includes a lateral bore 74 centrally intermediate its opposite ends and the outer end of the bore 74 is internally threaded. The inner end of the bore 74 opens into the inner end portion of the bore 48 adjacent the counterbore 50 and a pressure relief passage 76 communicates the inner end of the counterbore 50 with the inner end of the bore 74.

The externally threaded outer end of the neck 42 is threadedly engaged in the outer end portion of the bore 74 and the T-fitting of the vacuum spoiler 28 may be readily interposed in the line 30 merely by cutting the line 30 intermediate its opposite ends and then telescoping the adjacent ends of the cut sections 36 and 38 of the line 30 over the aligned ends of the T-fitting 40.

In operation, the vacuum spoiler 28 has the components thereof illustrated in the manner shown in FIG. 2 of the drawings when the engine 10 is operating under heavy load conditions and there is low vacuum within the manifold 24. When the internal parts of the vacuum spoiler 28 are thus positioned, fresh air is drawn inward through the air filter assembly 56 and through the bores 48 and 74 which define an L-shaped passage extending through the body 44. The fresh air then enters the positive crankcase ventilation line 30 and is ducted to the base of the carburetor. However, when the engine 10 is decelerating and operating with high vacuum in the manifold 24, the air filter 56 efficiently restricts the entrance of fresh air into the body 44 so as to maintain a reasonable amount of manifold vacuum within the bore 48. Thus, the free end of the shank portion 64 moves inwardly of the bore 48 and variably throttles the juncture of the bores 48 and 76 and thus the entrance of fresh ambient air into the positive crankcase ventilation line 30. Of course, as the high manifold vacuum operating condition of the engine 10 slowly changes to engine operation experiencing low manifold vacuum, the shank portion 64 of the piston 58 will slowly move out of position throttling the juncture between the bores 48 and 74 toward the position thereof illustrated in FIG. 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A valve body including a bore extending therethrough including an enlarged counterbore at one end, the other end of said bore including air filtering means, said body including a lateral passage opening outwardly of said body at one end and into said bore at the other end adjacent the inner end of said counterbore, a piston slidable between limit positions in said counterbore and including a shank portion projecting at least slightly into the adjacent end of said bore when said piston is positioned in its limit position of movement away from the inner end of said counterbore, spring means operatively connected between said body and piston yieldingly urging the latter toward said limit position of movement, said shank portion, when said piston is in its limit position of movement inwardly of said counterbore at least substantially blocking communication between the end of said bore adjacent said counterbore and said lateral passage.

2. The combination of claim 1 wherein said body includes a vent port communicating the inner end of said counterbore with said passage.

3. The combination of claim 1 wherein said spring means comprises a coil spring disposed about said shank portion between the inner end of said counterbore and the opposing face of said piston.

4. The combination of claim 1 including a vented end wall removably closing the outer end of said counterbore.

5. The combination of claim 4 wherein said piston is abuttingly engageable with the inner surface of said end wall to define the limit of movement of said piston toward the outer end of said counterbore.

6. The combination of claim 5 wherein said body includes a vent port communicating the inner end of said counterbore with said passage.

7. The combination of claim 6 wherein said spring means comprises a coil spring disposed about said shank portion between the inner end of said counterbore and the opposing face of said piston.

8. The combination of claim 1 including a positive crankcase valve controlled crankcase ventilation line, the outer end of said lateral passage being communicated with said line downstream from said valve.

9. The combination of claim 8 wherein said lateral passage is communicated with one outer end of one arm of a three arm hollow fitting, said line being separated downstream from said valve, the separated ends of said line being communicated with the outer ends of the other two hollow arms of said fitting.

* * * * *